Nov. 17, 1970 H. M. SCHLICKE ET AL 3,541,473
SUPPRESSION OF ELECTRO-MAGNETIC INTERFERENCE IN
ELECTRICAL POWER CONDUCTORS
Filed Oct. 2, 1967 2 Sheets-Sheet 1

CONNECTED IN PARALLEL TO FORM
ONE SIDE OF COAXIAL TRANSMISSION LINE

INVENTORS
HEINZ M. SCHLICKE
JOHN A. FILLAR
DENNIS P. HENKEL

BY

ATTORNEY

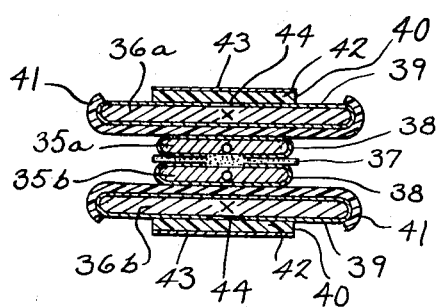
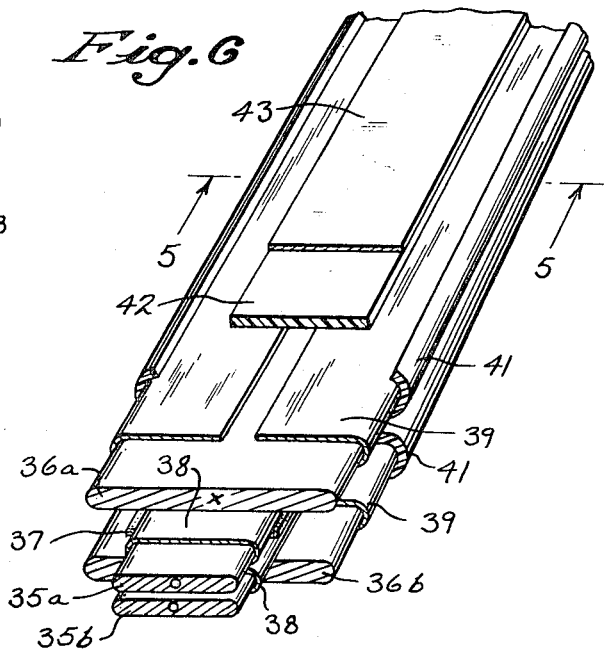
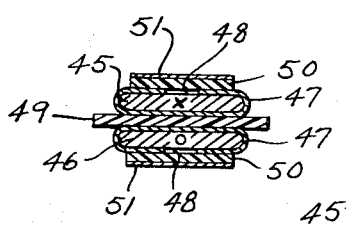
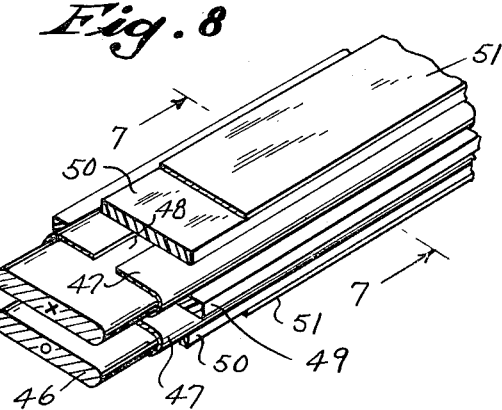
INVENTORS
HEINZ M. SCHLICKE
JOHN A. FILLAR
DENNIS P. HENKEL
BY
ATTORNEY 3,541,473
SUPPRESSION OF ELECTRO-MAGNETIC
INTERFERENCE IN ELECTRICAL POWER
CONDUCTORS
Heinz M. Schlicke, Fox Point, John A. Fillar, Milwaukee, and Dennis P. Henkel, Wauwatosa, Wis., assignors to Allen-Bradley Company, Milwaukee, Wis., a corporation of Wisconsin
Filed Oct. 2, 1967, Ser. No. 672,244
Int. Cl. H04b 3/28; H01p 3/06, 3/08
U.S. Cl. 333—12
4 Claims

ABSTRACT OF THE DISCLOSURE

A power transmission line, which may embody one or more conductors. At least one of the conductors having a layer of high permeability, high resistivity lossy material along at least a portion of its length. The lossy layer defining a gap longitudinally thereof to prevent magnetic saturation of the layer. The gap is relatively narrow to provide a "proximity effect" to prevent RFI from entering the conductor.

BACKGROUND OF THE INVENTION

The present invention relates to the application of lossy filters to power transmission lines for the suppression of electromagnetic (EMI) or radio frequency (RFI) interference. There have been previous suggestions for distributing lossy filters along power supply lines, but the practicality and economy of replacing lossy filters by so called "lossy lines" appears to be highly questionable. It seems, with presently available materials, lossy lines are effective only if they are either very long lines (in the order of magnitude of hundreds of meters or miles), or where very high frequencies (about 10 mHz.) are involved. Two major, basic limitations are encountered:

(1) It is not a simple matter to provide, at a fixed frequency, attenuation by given length. Rather, the shorter the lossy cable, the higher the frequency at which it is effective.

(2) Lossy cables may be made very effective for short lengths, but then previously suggested coatings on the conductor become prohibitively thick, costly, and make the conductor very stiff and non-flexible.

SUMMARY OF THE INVENTION

It is therefore contemplated by the present invention to provide a compact power transmission cable, which may comprise spaced apart, parallel conductors in order to reduce size, and in which the magnetic biasing effect of power current may be reduced. The invention further contemplates the utilization of high permeability, high resistivity lossy material surrounding the power conductor which, in theory, utilizes the "skin effect" of the power conductor to attenuate high frequencies. This is not new in itself, but the invention further anticipates utilization of the full permeability of the material available to the frequencies to be attenuated. It is known that the magnetic bias of the power line current will reduce the permeability of such materials. In order to accomplish this result, two effects are exploited:

(1) The proximity effect of adjacent conductor portions which acts to prevent RFI from penetrating into narrow gaps, and thereby be conducted along the conductor, and (2) Providing gaps in the high permeability, high resistive layer in a region where the high frequency field is either reduced to zero or a minimal value.

BRIEF DESCRIPTION OF THE DRAWINGS

Other objects of this invention will become apparent from the following description taken in connection with the accompanying drawings, of which:

FIG. 3 and 4 are views illustrative of another embodiment of the cable of the present invention, wherein FIG. 4 is a perspective view, with layers broken away and FIG. 3 is a cross-sectional view taken along a section 3—3 of the perspective view of FIG. 4.

FIG. 5 is a cross-sectional view taken along section 5—5 of FIG. 6, illustrating a further embodiment of the present invention.

FIG. 6 is a perspective view, with layers broken away, of the cable of the embodiment of FIG. 5.

FIGS. 7 and 8 illustrate a still further embodiment of the present invention, wherein FIG. 7 is a cross-sectional view taken along the plane 7—7 of the perspective view of FIG. 8.

DESCRIPTION OF THE SEVERAL EMBODIMENTS

Figure 1:
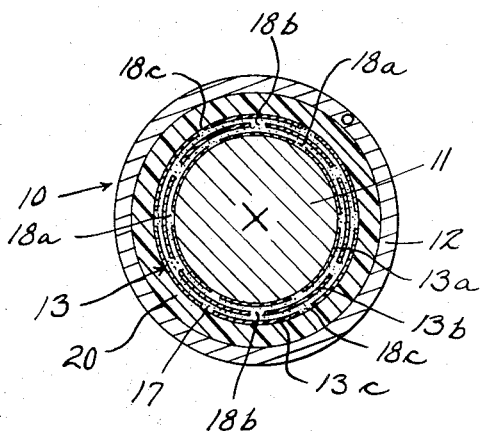
FIG. 1 is a cross-sectional view, taken along a section 1—1 of FIG. 2, illustrating one embodiment of the present invention.
Figure 2:
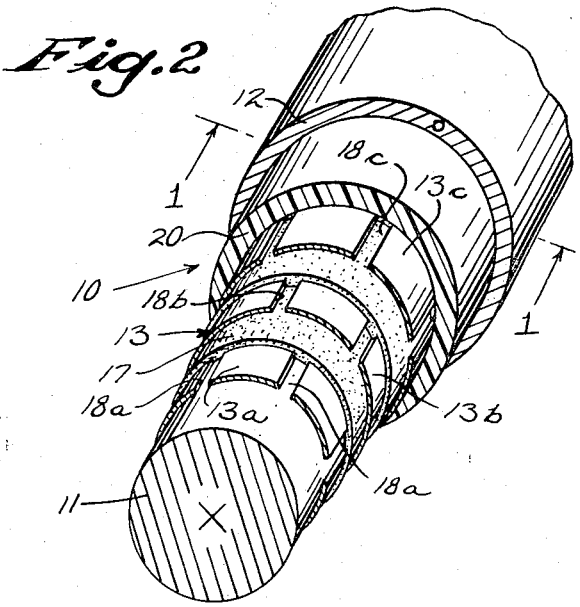
FIG. 2 is a perspective view of the power cable of FIG. 1 with layers broken away to better illustrate the invention.

Referring first to the embodiment of FIGS. 1 and 2, it will be observed that a power conductor, indicated generally by the numeral 10, comprises a normal mode conductor arrangement, i.e. an inner, entering power (x) conductor 11 of a material such as copper and an outer return (o) power conductor 12 of similar conducting material.

It is to be noted that the views of the drawings have been, in part, greatly enlarged for ease of illustration. For instance, film thickness and gap width have been greatly exaggerated for this purpose. Surrounding the inner conductor are a series of overlapped layers 13 of a high permeability, high resistive material.

Electrical conductors utilized for supplying alternating current have long been known to have high current concentrations at the outer peripheral margin of the conductor. Thus, the flux generated by the current will also generate a counter-electromotive force in the conductor greater in the center of the conductor than at its adjacent surface. The current concentration near the outer surface of the conductor will increase its effective resistance to the flow of alternating current. At the usual power frequencies, the increase is comparatively small, but it becomes quite pronounced at higher or radio frequencies. Thus, enhancement of the current concentration at the outer periphery will provide effective resistance to the undesirable higher frequencies at the outer periphery, and thereby eliminate or reduce undesired noise or interference affecting sensitive equipment located in the proximity of the power line.

Thus, the high frequency noise or interfering currents will find a path only through the lossy, highly resistive shell through which it is conducted. In other words, the conductor 11, as far as the high frequency current is concerned, acts only as a mechanical support for the lossy layer 13. The high frequencies will remain in the high permeability, high resistivity layer.

There are various materials that will provide these high permeability, high resistance characteristics. These may include various nickel-iron alloys, known as the "Permalloys," wherein the basic nickel-iron alloy may be varied to include chromium, copper or molybdenum, as desired. Thus, the arrangement contemplated by this embodiment utilizes the deposition of a first layer 13a as a series of circumferentially spaced concentric strips along the longitudinal axis of the conductor 11, and an overlayer 17 of insulation, such as varnish or paint. Glass or alumina may be required as insulation in certain cases where high annealing temperatures are encountered with a certain selected high permeability, high resistance material. A second layer 13b of the same high resistance, high permeability material, which overlaps the series of gaps 18a defined by the spaced apart arcuate segments 13a, and if desired, depending upon the frequency (lower frequencies require more lossy material), a third series of layers 13c is deposited to overlap the gaps 18b of the second series of layers 13c, with the insulation 17 being deposited between each of the layers 13a, 13b and 13c. The layer 13c is segmented to provide longitudinal gaps 18c.

A dielectric layer 20 is next deposited to insulate the conductor 11 from the conductor 12. This dielectric layer 20 may be a polycarbonate, or a polyester, such as Mylar.

The gaps 18a, 18b and 18c reduce the magnetic bias effect of the low frequency line. Without these gaps, the high permeability, high resistivity material will tend to magnetically saturate and become ineffective. This has been the problem in providing RFI protection in the past.

Figure 3:
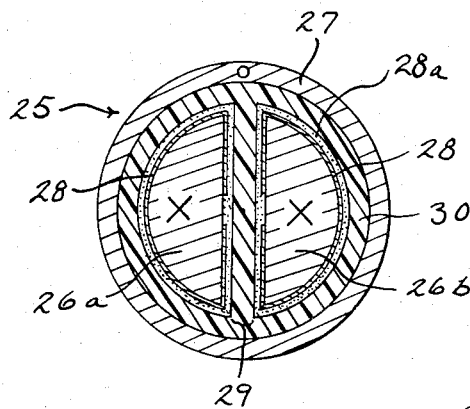
Figure 4:
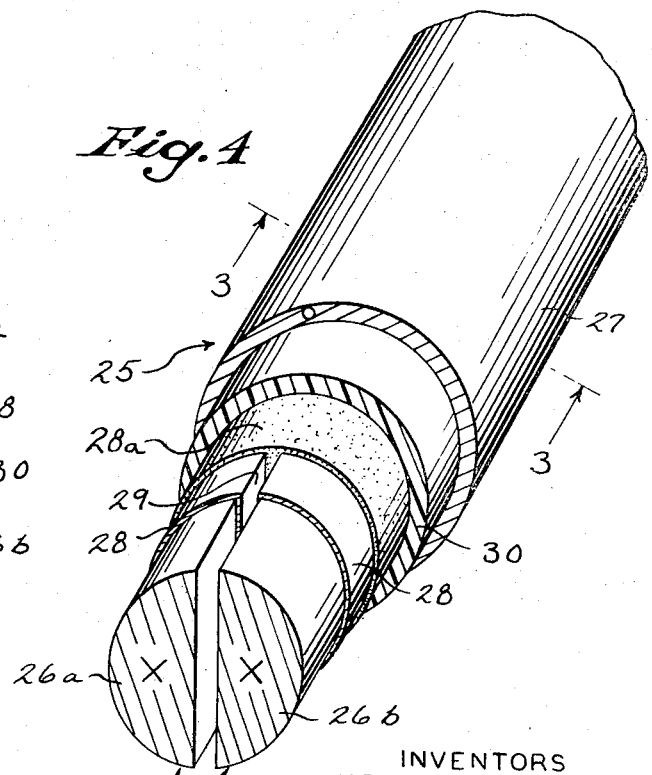

The embodiment of FIGS. 3 and 4 is illustrative of another normal mode lossy power transmission line which is insensitive to current bias. This construction provides greater facility in fabrication than the embodiment of FIGS. 1 and 2. That is, the cable 25 comprises split paralleled conductors 26a, 26b for the entering current and a concentrically spaced tubular return conductor 27. The conductor portions 26a, 26b are preferably joined at axially spaced intervals (not shown), to maintain conductivity, although the portions may be electrically connected at their termini.

Each of the conductor portions 26a, and 26b includes an outer adjacent layer 28 of high permeability, high resistivity material, such as the nickel-iron material described in connection with the embodiment of FIGS. 1 and 2. The layer 28 surrounds the major portion of the outer periphery of each of the conductor portions 26a, 26b, or if desired, may totally surround each conductor portion. The portions 26a and 26b may be considered as one conductor, but with the closely adjacent portions defining a gap 29 therebetween. A layer 28a of a clamping or positioning varnish may be deposited over the lossy layer 28 as a means of tightly bonding the layer 28 to the conductor portions 26a and 26b, should the layer be fabricated as a separte sheet-like member formed to fit the contour of the respective conductor portions. The gap 29 prevents the material of the layer 28 from becoming magnetically saturated as current passes through the inner conductor comprising the narrowly spaced portions 26a and 26b. In addition, a dielectric material 30 is provided as an insulator between the conductor portions 26a, 26b and the outer conductor 27. The dielectric provides a means of physical separation to define the gap 29 between the conductor portions 26a and 26b from one another to prevent magnetic saturation of the material of the layer 28. The close positioning of the conductor portions 26a, 26b, with the dielectric constant material 30 and the relative closeness of the portions 26a, 26b to conductor 27 provide a so called, "proximity effect," tending to force high frequency interference away from the gap 29.

The embodiments of FIGS. 1–4, inclusive, are shown in the normal mode for the power frequency, i.e. current flowing in opposite directions in conductors 11 and 12 of the embodiment of FIGS. 1 and 2 and the portions 26a, 26b and the outer conductor 27. However, it is fully contemplated that the conductors may be fully protected from common mode RFI by depositing an outer, suitably gapped layer (not shown) of lossy, high permeability, high resistivity material externally adjacent to conductors 12 (FIGS. 1 and 2) and 27 (FIGS. 3 and 4). Also, it may be desired to provide an outer insulation (not shown) of conventional insulating material suitable for desired voltage protection. In the normal mode arrangement there is usually no need for the additional lossy material layer for the outer conductors 12 or 27 as these conductors may be grounded.

The embodiment of FIGS. 5 and 6 provides a means of utilizing relatively flat strip conductors, and is somewhat similar to the embodiment of FIGS. 3 and 4, in that it utilizes two current-entering conductor portions, 35a and 35b, respectively. In this case, the current return conductor is also provided as two portions of conductive strip material 36a and 36b, respectively. As shown the conductors are arranged for normal mode operation. As before mentioned, arrangements should be made to insure electrical connection (not shown) between the conductor portions 35a, 35b and 36a, 36b, respectively.

The innermost conductor portions 35a, 35b are positioned closely adjacent one another and are separated by means of a dielectric layer 37. Each of the conductor portions 35a, 35b and 36a, 36b are provided with a coating 38 and 39, respectively, of high permeability, high resistivity material, which may be the same material as that previously described. The dielectric layer 37 provides a gap which prevents magnetic saturation of the coating 38 on the conductor portions 35a and 35b. An overcoating of dielectric material 41, such as that of the previously described embodiments, is provided to insulate the conductor halves 35a, 35b from the halves 36a, 36b, and extends upwardly along the longitudinal sides thereof to extend the insulating protection to lessen creepage problems. An additional layer 42 of the same dielectric material as the layer 41 is overlaid over the high permeability, high resistivity layer 39, of the conductors 36a, 36b. An additional high permeability, high resistivity layer 43 is deposited on the dielectric material 42 of each conducting strip 36a and 36b.

It is to be noted that in the present embodiment, the layer 39 of the conductor portions 36a and 36b is interrupted at the outer surface to define a gap 44. The gap 40 prevents magnetic saturation of the respective layer 39. The outer lossy layers 43 prevent the high frequency current from entering the respective conductor portions 36a and 36b. The layers 43 are required in this embodiment as the conductor portions 36a and 36b are not continuous as are the tubular outer conductors 12 and 27 of the embodiments of FIGS. 1 and 3, respectively.

FIGS. 7 and 8 illustrate an embodiment which is a simplified form of the version of the present invention, and utilizes flat, strip-like conductors 45 and 46, each covered with the lossy, high permeability, high resistivity material 47 as previously described in connection with the previously described embodiments. Here, the material 47 terminates to provide gaps 48 disposed at opposite surfaces of the conductors 45 and 46 with an intermediate dielectric layer 49 interposed between the conductors. The dielectric layer 49 extends laterally outwardly from opposite longitudinal edges of the conductors 45 and 46 to provide additional creepage distance between the conductors 45 and 46. Additional dielectric layers 50 are laid over the high resistance, high permeability layers 47 to overlap the gaps 48, respectively, of the conductors 45 and 46. Again, an outer lossy layer 51 of high permeability, high resistivity material is provided to prevent high frequency current from entering the conductors through gap 48.

It will be observed from a comparison of the embodiment of FIGS. 5 and 6 with that of FIGS. 7 and 8, that the former comprises a substantial mirror image pair of the latter about an imaginary center line drawn through the dielectric layer 37. It will also be apparent that the embodiment of FIGS. 7 and 8 may comprise a single cable element with the conductor strips 45 and 46 being arranged for common mode operation.

As stated previously although no outer insulation has been disclosed, it will be apparent that the cables of each of the FIGS. 1–8, inclusive, may be enclosed by an insulating layer to prevent contact with other electrical conductors or equipment (not shown). In addition, it is within the scope of this invention to provide a single conductor (rather than the coaxial arrangement illustrated in the embodiments of FIGS. 1-8, inclusive). The conductor, not shown, would have a layer of high permeability, high resistance material terminating in a gap, as previously described. An overlayer of high dielectric constant material would overlay the first layer.

We claim:

1. An electric power transmitting conductor for supplying electric power subject to high frequency interference, comprising two parallel conductive members wherein the parallel conductive members comprise an inner member and an outer tubular member surrounding said inner member, said inner member having deposited along its peripheral surface a layer of high permeability, high resistivity, lossy material defining at least one longitudinal gap, an insulating layer covering said lossy material and gap, at least a second layer of said lossy material deposited on said insulating layer and overlaying the gap of said first lossy layer, said second lossy layer being separated by at least one longitudinal gap circumferentially spaced from the first mentioned gap, said gaps preventing magnetic saturation of the respective lossy material layers, and dielectric material deposited between said lossy layers and said tubular conductive member.

2. An electric power transmitting conductor for supplying electric power subject to high frequency interference, comprising two parallel conductive members, wherein the parallel conductive members comprise an inner member and an outer tubular member surrounding said inner member, said outer member of opposite power made relative to said inner member, said member being split to provide at least two narrowly spaced conductive portions of the same operating power mode, a layer of high permeability, high resistivity, lossy material deposited along the peripheral surface of each of said portions, marginal edges of each lossy layer defining a longitudinal gap located in the narrow spacing between said portions to prevent magnetic saturation of said lossy material, dielectric material deposited between said inner conductor portions and between said inner conductor and said outer conductor.

3. An electric power transmitting conductor for supplying electric power subject to high frequency interference, comprising two parallel conductive members, wherein the parallel conductive members comprise relatively flat, elongated strips, each of said strips including an outer layer of high permeability, high resistivity, lossy material deposited thereon, said layer terminating at two longitudinal marginal edges to define a gap for preventing magnetic saturation of said lossy material, a layer of dielectric material between said conductive members and said lossy material deposited thereon, layers of dielectric material deposited on the respective opposed surfaces of said lossy material covered conductive members, and outer layers of said lossy material deposited on the exposed surfaces of said opposed dielectric layers.

4. The conductor of claim 3, wherein at least a pair of said conductors are disposed in substantial mirror image relationship at either side of one of said opposed dielectric layers.

References Cited

UNITED STATES PATENTS

| 863,247 | 8/1907 | Yeatman | 333—79 |
| 1,307,995 | 6/1919 | Armor | 333—79 |
| 2,669,603 | 2/1954 | Prache | 178—48 |
| 2,740,095 | 3/1956 | Somes | 333—96 |

FOREIGN PATENTS 839,208  6/1960  Great Britain.

HERMAN KARL SAALBACH, Primary Examiner

W. N. PUNTER, Assistant Examiner

U.S. Cl. X.R.

333—79, 84, 96, 97